(12) United States Patent
Kawaguchi

(10) Patent No.: US 7,644,252 B2
(45) Date of Patent: Jan. 5, 2010

(54) MULTI-PROCESSOR SYSTEM AND MEMORY ACCESSING METHOD

(75) Inventor: Eiichiro Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/979,139

(22) Filed: Oct. 31, 2007

(65) Prior Publication Data

US 2008/0065856 A1    Mar. 13, 2008

Related U.S. Application Data

(63) Continuation of application No. 11/082,712, filed on Mar. 18, 2005, now abandoned.

(30) Foreign Application Priority Data

Mar. 23, 2004    (JP)    ............................. 2004-085673

(51) Int. Cl.
  *G06F 12/00*    (2006.01)
(52) U.S. Cl. ...................... 711/207; 711/129; 711/147; 711/148; 711/153; 711/E12.023
(58) Field of Classification Search ................. 711/207, 711/129, 147, 148, 153, E12.023
  See application file for complete search history.

(56) References Cited

U.S. PATENT DOCUMENTS

| | | | |
|---|---|---|---|
| 4,916,426 A | 4/1990 | Yajima et al. | |
| 6,314,501 B1 | 11/2001 | Gulick et al. | |
| 6,449,699 B2 | 9/2002 | Franke et al. | |
| 6,467,007 B1 | 10/2002 | Armstrong et al. | |
| 6,567,897 B2 | 5/2003 | Lee et al. | |
| 6,684,305 B1 | 1/2004 | Deneau | |
| 6,874,014 B2 | 3/2005 | Richardson et al. | |
| 6,961,761 B2 | 11/2005 | Masuyama et al. | |
| 7,047,394 B1 | 5/2006 | Van Dyke et al. | |
| 7,076,628 B1 * | 7/2006 | Ali et al. ...................... | 711/170 |
| 2001/0052054 A1 | 12/2001 | Franke et al. | |
| 2002/0184345 A1 | 12/2002 | Masuyama et al. | |
| 2004/0088509 A1 | 5/2004 | Brucklmayr et al. | |

FOREIGN PATENT DOCUMENTS

JP    62-226367    10/1987

(Continued)

*Primary Examiner*—Christian P Chace
*Assistant Examiner*—Mehdi Namazi
(74) *Attorney, Agent, or Firm*—Foley & Lardner LLP

(57) ABSTRACT

A multiprocessor system includes a plurality of microprocessors configured to operate on a plurality of operating systems, respectively, and a memory section configured to have a plurality of memory spaces respectively allocated to the plurality of microprocessors. Each of the plurality of microprocessors may include a translation look-aside buffer (TLB) and a page table register. The TLB stores a copy of at least a part of data of one of the plurality of memory spaces corresponding to the microprocessor, and the copy includes a relation of each of virtual addresses of a virtual address space and a corresponding physical address of a physical address space as the memory space. The page table register refers to the TLB in response to an execution virtual address generated based on an application program to be executed by the microprocessor to determine an execution physical address corresponding to the execution virtual address. The microprocessor accesses the memory space based on the execution physical address.

15 Claims, 8 Drawing Sheets

FOREIGN PATENT DOCUMENTS

| | | |
|---|---|---|
| JP | 64-037636 | 2/1989 |
| JP | 2-96833 | 4/1990 |
| JP | 5-204760 | 8/1993 |
| JP | 11-85547 | 3/1999 |
| JP | 2000-305841 A | 11/2000 |
| JP | 2001-022713 A | 1/2001 |
| JP | 2001-101032 A | 4/2001 |
| JP | 2001-101034 A | 4/2001 |
| JP | 2002-532806 A | 10/2002 |
| JP | 2003-030162 A | 1/2003 |

* cited by examiner

| VIRTUAL ADDRESS (VIRTUAL PAGE NO.) | PHYSICAL ADDRESS (PHYSICAL PAGE NO.) |
|---|---|
|  |  |
|  |  |
| ⋮ | ⋮ |
|  |  |

Fig. 9

| UPPER LIMIT PHYSICAL ADDRESS | LOWER LIMIT PHYSICAL ADDRESS |
|---|---|
| | |

Fig. 10

| OS NO. | VIRTUAL ADDRESS (VIRTUAL PAGE NO.) | PHYSICAL ADDRESS (PHYSICAL PAGE NO.) |
|---|---|---|
| | | |
| | | |
| | ⋮ | ⋮ |
| | | |

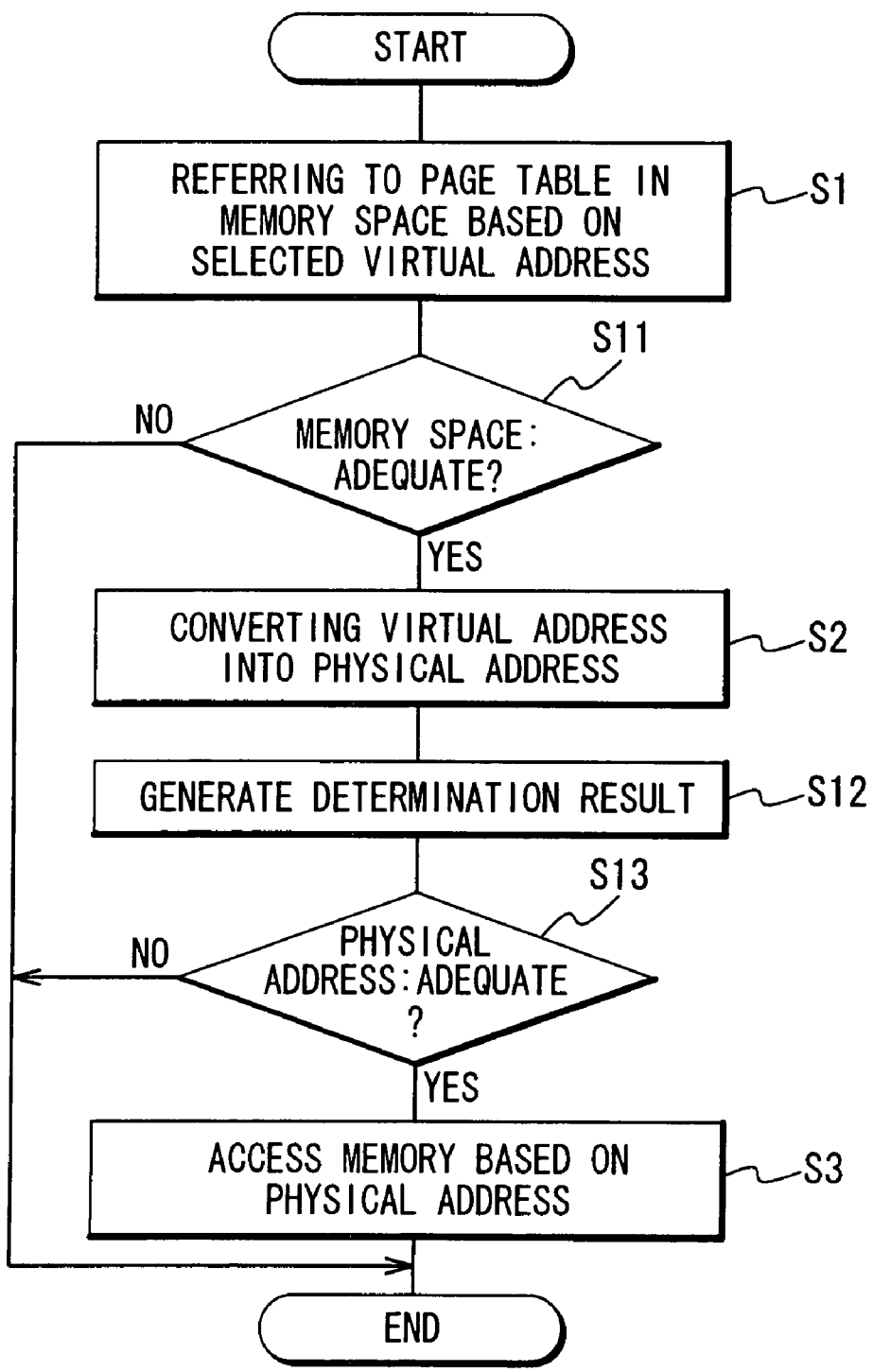

MULTI-PROCESSOR SYSTEM AND MEMORY ACCESSING METHOD

CROSS-REFERENCE TO RELATED PATENT APPLICATIONS

This application is a continuation of application Ser. No. 11/082,712, filed Mar. 18, 2005, now pending, and based on Japanese Patent Application No. 2004-085673, filed Mar. 23, 2004, by Eiichiro Kawaguchi, which is incorporated herein by reference in its entirety. This application claims only subject matter disclosed in the parent application and therefore presents no new matter.

BACKGROUND OF THE INVENTION

1. Field of the Invention

The present invention relates to a multi-processor system and a memory accessing method.

2. Description of the Related Art

In recent years, a multi-processor system including a plurality of processors has been developed in order to improve processing performance.

FIG. 1 shows a schematic diagram of a multi-processor system of a first conventional example. The conventional multi-processor system includes an operating system (OS), a plurality of MPUs (Micro Processing Units) operating on the operating system (OS), and a main memory. The plurality of MPUs share the main memory. The multi-processor system further has input/output (I/O) units (not shown). The plurality of MPUs share the I/O units. In such a conventional multi-processor system, when a trouble such as abnormality or fault has occurred in a part of the resource such as the main memory and the I/O units shared by the plurality of MPUs, there is a possibility that the trouble influences on the entire system.

From the viewpoint of the plurality of operating systems running on a single computer system, a virtual machine (VM) system is known as a second conventional example. FIG. 2 shows a schematic diagram of the virtual machine (VM) system. The virtual machine system includes a host operating system (OS) running on the computer, and a plurality of guest operating systems running on the virtual machine. In the virtual machine system, the host operating system (OS) is first started on the computer to operate the virtual machine. The plurality of guest operating systems run on the virtual machine generated on the host operating system (OS). However, in the virtual machine system, when a trouble such as abnormality or fault has occurred in a hardware resource in association with the host operating system (OS), or when the trouble has occurred in the host operating system (OS), the plurality of guest operating systems running on the virtual machine receive the influence of the trouble. Thus, the trouble has influence on the entire system.

Moreover, a logic dividing system is known as a third conventional example. FIG. 3 shows a schematic diagram of the logic dividing method. The logic dividing system includes an MPU and a plurality of operating systems running on the MPU. In the logic dividing system, a host operating system (OS) is not needed unlike the virtual machine system, but the plurality of operating systems run on the same computer. However, in the logic dividing system, since the plurality of operating systems run on the single MPU, the plurality of operating systems receive the influence of a trouble, when the trouble has occurred in the MPU. Hence, the trouble has influence on the entire system.

In conjunction with the above description, Japanese Laid Open Patent Application (JP-A-Heisei 5-204760) discloses a control system of a virtual machine system. The virtual computer system of this conventional example is provided with a plurality of operating systems and a management program for managing the plurality of operating systems. Under the control of this management program, the plurality of operating systems run on a single computer system. A control system of a virtual computer system includes a virtual address—real address converting section and a real address—absolute address converting section. The virtual address—real address converting section assigns a plurality of continuous spaces on a main memory to the plurality of operating systems, and has an address management table. The virtual address—real address converting section uses an address conversion table in the operating system to convert a virtual address into a real address. The real address—absolute address converting section converts the real address obtained by this virtual address—real address converting section to a physical address of the main memory by using the address management table.

Also, Japanese Laid Open Patent Application (JP-A-Heisei 2-96833) discloses a job control system. An information processing apparatus for the job control system of this conventional example includes a central processing unit, a main memory, an input/output processor and peripheral units connected to the input/output processor. The control of information processing to be carried out by the information processing apparatus is based on a general-purpose control section stored in a memory region of the main memory. In the job control system, the general-purpose control section has a section for starting a job of a model control section operating under a control of the general-purpose control section, and a section for reserving continuous memory regions different from a memory management region for the general-purpose control section in the main memory when starting the job. The reserved memory region stores sub jobs to be executed under the control of the model control section, a job memory management section of the model control section, a job task management section of the model control section, and a job interruption control section of the different model control section.

Also, Japanese Laid Open Patent Application (JP-P2001-101032A) discloses an operating system (OS) monitoring system for control between different operating systems. The operating system monitoring system of this conventional example detects an occurrence of a software trouble in a computer system on which a plurality of operating systems run. The operating system (OS) monitoring system has a function of separating hardware resources for the plurality of operating systems by using a virtual hardware which has a function of distributing interruptions from the hardware or the processing time of a CPU. Also, the operating system (OS) monitoring system has a function of permitting data to be read and written between the plurality of operating systems. The operating system monitoring system monitors the operations of the operating systems by periodically checking the writing of the data and the written data and carries out re-loading of the operating systems when detecting the trouble.

Also, Japanese Laid Open Patent Application (JP-P2001-101034A) discloses a trouble recovering system for control between different operating systems. The trouble recovering system of this conventional example uses a computer system in which a plurality of operating systems run simultaneously. The trouble recovering system has first to fourth units. The first unit assigns hardware resources to the plurality of operating systems. The first unit also attains, by using a software technique, a firewall as a virtual wall for isolating software and hardware such that a trouble of the hardware or the operating system has no influence on the execution of the other operating systems. Also, the first unit transmits information between the respective operating systems. The second unit monitors the operation states of the operating systems and an application program from an isolated operation environment and detects a trouble, stop and an operation impossible state of either of the operating systems. The third unit normally or forcedly stops the troubled operating system (OS). The fourth unit re-starts the operating systems. Thus, the trouble recovering system recovers the system automatically at the time of the trouble occurrence by combining them.

Also, Japanese Laid Open Patent Application (JP-A-Heisei 11-85547) discloses a virtual cluster configuring method. The virtual cluster configuring method of this conventional example has a virtual cluster configuring unit and an inter-virtual-cluster communicating unit. The virtual cluster configuring unit has dedicated hardware resources such as a processor, a physical memory, and an external device, and configures a plurality of virtual clusters, on which an operating system run on a single computer. In the inter-virtual-cluster communicating unit, processes on the different virtual clusters communicate with each other.

SUMMARY OF THE INVENTION

An object of the present invention is to provide a multi-processor system that can restrict influence of a trouble to a minimum, and a memory accessing method.

In an aspect of the present invention, a multiprocessor system includes a plurality of microprocessors configured to operate on a plurality of operating systems, respectively, and a memory section configured to have a plurality of memory spaces respectively allocated to the plurality of microprocessors.

Here, each of the plurality of microprocessors may include a translation look-aside buffer (TLB) and a page table register. The TLB stores a copy of at least a part of data of one of the plurality of memory spaces corresponding to the microprocessor, and the copy includes a relation of each of virtual addresses of a virtual address space and a corresponding physical address of a physical address space as the memory space. By use of the page table register, the microprocessor refers to the TLB in response to an execution virtual address generated based on an application program to be executed by the microprocessor to determine an execution physical address corresponding to the execution virtual address. The microprocessor accesses the memory space based on the execution physical address.

In this case, a page table may be provided for the memory space to store the relation of the virtual addresses and the corresponding physical address. The TLB stores the copy of the page table.

Also, the page table may further store an identifier to identify the operating system. By use of the page table register, the microprocessor may refer to the TLB to determine whether the stored identifier and the identifier held by the microprocessor are coincident with each other, and refer to the TLB for translation of the execution virtual address into the execution physical address, when the stored identifier and the identifier held the microprocessor are coincident with each other.

Also, the microprocessor may further include an address check circuit configured to generate a determination result to indicate whether or not the execution physical address meets a predetermined condition. When the determination result indicates that the execution physical address meets the predetermined condition, the microprocessor accesses the memory space based on the execution physical address. In this case, the predetermined condition may be whether the execution physical address is in a range from an upper limit physical address to a lower limit physical address in the memory space. The microprocessor may further include an upper limit & lower limit physical address storage section configured to store the upper limit physical address and the lower limit physical address.

In another aspect of the present invention, a memory access method is achieved by providing a plurality of microprocessors configured to operate on a plurality of operating systems, respectively, and a memory section configured to have a plurality of memory spaces allocated to the plurality of microprocessors; and by accessing an allocated memory space of the plurality of memory spaces by one of the plurality of microprocessors.

Here, when virtual addresses and physical addresses are allocated to each of the plurality of memory spaces, respectively, the memory space may have a page table configured to store a relation of each of the virtual addresses and a corresponding one of the physical addresses. The accessing may be achieved by referring to the page table in the memory space in response to an execution virtual address to determine execution physical address corresponding to the execution virtual address; and by accessing the memory space based on the execution physical address.

Also, when the page table in the memory space stores an identifier to identify the memory space, the accessing may be achieved by referring to the page table in the memory space to determine whether the stored identifier and the identifier held the microprocessor are coincident with each other; and by when the stored identifier and the identifier held the microprocessor are coincident with each other, determining the execution physical address.

Also, when the microprocessor further includes an address check circuit, the accessing may be achieved by generating a determination result from the address checking circuit to indicate whether or not the execution physical address meets a predetermined condition when the execution physical address is determined; and by accessing the memory space based on the execution physical address when the determination result indicates that the execution physical address meets the predetermined condition.

Also, when the condition is a range from an upper limit physical address of the physical addresses allocated to the memory space to a lower limit physical address of the physical addresses, the accessing may be achieved by generating a determination result indicating whether or not the execution physical address is contained in the range when the execution physical address is determined; and by accessing the memory space based on the execution physical address when the determination result indicates that the execution physical address is contained in the range.

BRIEF DESCRIPTION OF THE DRAWINGS

FIG. 6 is a diagram showing a page table in the multi-processor system of the present invention;

FIG. 9 is a diagram showing an upper limit & lower limit physical address storing unit in the multi-processor system of the second embodiment;

FIG. 10 is a diagram showing the page table in the multi-processor system according to the second embodiment of the present invention; and FIG. 11 is a flowchart showing the operation of the multi-processor system according to the second embodiment of the present invention.

DESCRIPTION OF THE PREFERRED EMBODIMENTS

Hereinafter, a multi-processor system according to the present invention will be described in detail with reference to the attached drawings.

Figure 1:
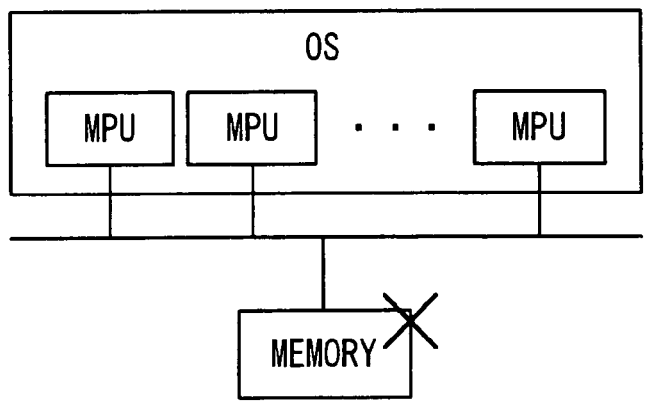
FIG. 1 is a schematic diagram showing a multi-processor system of a first conventional example.
Figure 2:
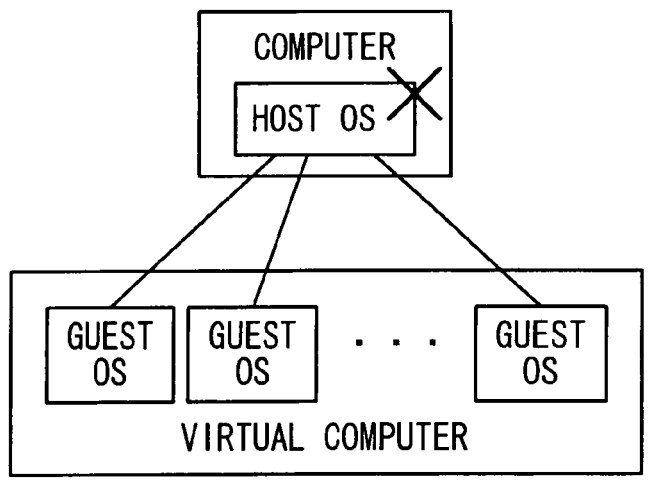
FIG. 2 is a schematic diagram showing a virtual machine (VM) system of a second conventional example.
Figure 3:
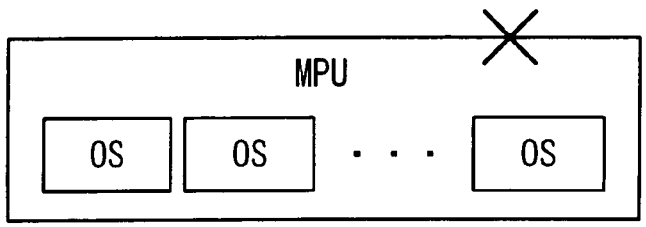
FIG. 3 is a schematic diagram showing a logic dividing system of a third conventional example.
Figure 4:
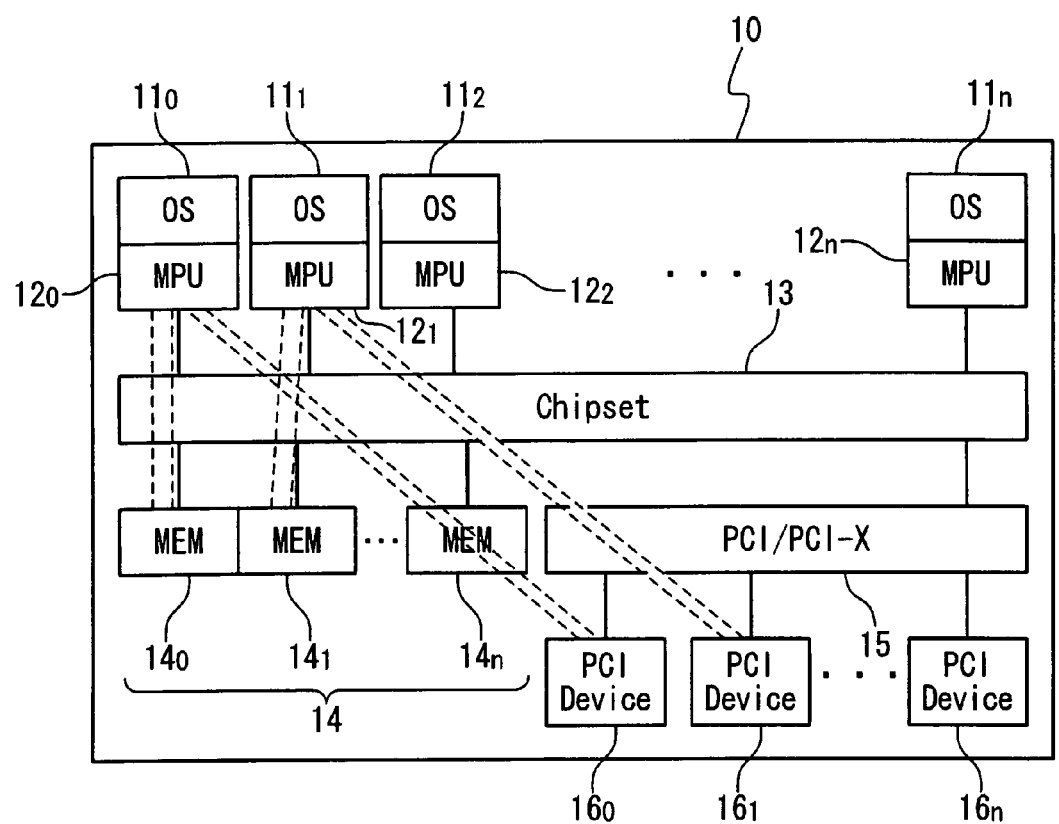
FIG. 4 is a schematic diagram showing the hardware configuration of a multi-processor system according to a first embodiment of the present invention.

FIG. 4 shows a schematic diagram of the hardware configuration of the multi-processor system according to the first embodiment of the present invention. The multi-processor system 10 of the present invention includes a plurality of operating systems $11_0$ to $11_n$ (n is an integer of 1 or more), a plurality of MPUs (Micro Processor Units) $12_0$ to $12_n$, a chip set 13, a main memory 14, an input/output device controller (PCI/PCI-X) 15 and a plurality of input/output device groups (PCI device groups) $16_0$ to $16_n$. The plurality of MPUs $12_0$ to $12_n$ are microprocessors for supporting virtual addresses. The chip set 13 is a controller for linking a symmetrical type multi-processor system (SMP) and is connected to the plurality of MPUs $12_0$ to $12_n$, the main memory 14 and the input/output device controller 15. The main memory 14 has a plurality of memory spaces (MEM spaces) $14_0$ to $14_n$ and a table for managing a system configuration. The input/output device controller (PCI/PCI-X) 15 is a controller to control the PCI device groups $16_0$ to $16_n$.

The plurality of MPUs $12_0$ to $12_n$ operate on the plurality of operating systems $11_0$ to $11_n$, respectively. That is, the first MPU $12_0$ of the plurality of MPUs $12_0$ to $12_n$ operates the first operating system (OS) $11_0$ of the plurality of operating systems $11_0$ to $11_n$. The second MPU $12_1$ of the plurality of MPUs $12_0$ to $12_n$ operates the second operating system (OS) $11_1$ of the plurality of operating system (OS)s $11_0$ to $11_n$. The j-th (j=0, 1, 2 to n) MPU $12_j$ of the plurality of MPUs $12_0$ to $12_n$ operates the j-th operating system (OS) $11_j$ of the plurality of operating systems $11_0$ to $11_n$.

The plurality of memory spaces (MEMs) $14_0$ to $14_n$ are assigned to the plurality of MPUs $12_0$ to $12_n$, respectively. That is, the memory (MEM) $14_0$ of the plurality of memories (MEMs) $14_0$ to $14_n$ is assigned to the MPU $12_0$. The memory (MEM) $14_1$ of the plurality of memories (MEMs) $14_0$ to $14_n$ is assigned to the MPU $12_1$. The memory (MEM) $14_j$ of the plurality of memories (MEMs) $14_0$ to $14_n$ is assigned to the MPU $12_j$. It is not always necessary that the memory spaces (MEMs) $14_0$ to $14_n$ are fixedly assigned to the MPUs $12_0$ to $12_n$, respectively. In short, the memory space (MEM) $14_1$ may be used by the MPU $12_0$, and the memory space (MEM) $14_0$ may be used by the MPU $12_1$. Which of the memory spaces is allocated to either of the MPUs $12_0$ to $12_n$ is determined by referring to the system configuration management table set by a user. In this embodiment, it is assumed that the plurality of memories (MEMs) $14_0$ to $14_n$ are assigned to the plurality of MPUs $12_0$ to $12_n$, respectively, in an order from the number 1 to in the number n.

The PCI device groups $16_0$ to $16_n$ are assigned to the plurality of MPUs $12_0$ to $12_n$, respectively. That is, the PCI device group $16_0$ of the plurality of PCI device groups $16_0$ to $16_n$ is assigned to the MPU $12_0$. The PCI device group $16_1$ of the plurality of PCI device groups $16_0$ to $16_n$ is assigned to the MPU $12_1$. The PCI device group $16_j$ of the plurality of PCI device groups $16_0$ to $16_n$ is assigned to the MPU $12_j$. The number of the PCI devices is not limited to n, and may exceed n. For example, when the PCI device group $16_0$ may include three PCI devices, the three PCI devices may be assigned to the MPU $12_0$. Also, when the PCI device $16_1$ may include five PCI devices, and the five PCI devices may be assigned to the MPU $12_1$. Which of the PCI device groups is allocated to either of the MPUs is determined by referring to the system configuration management table.

Figure 5:
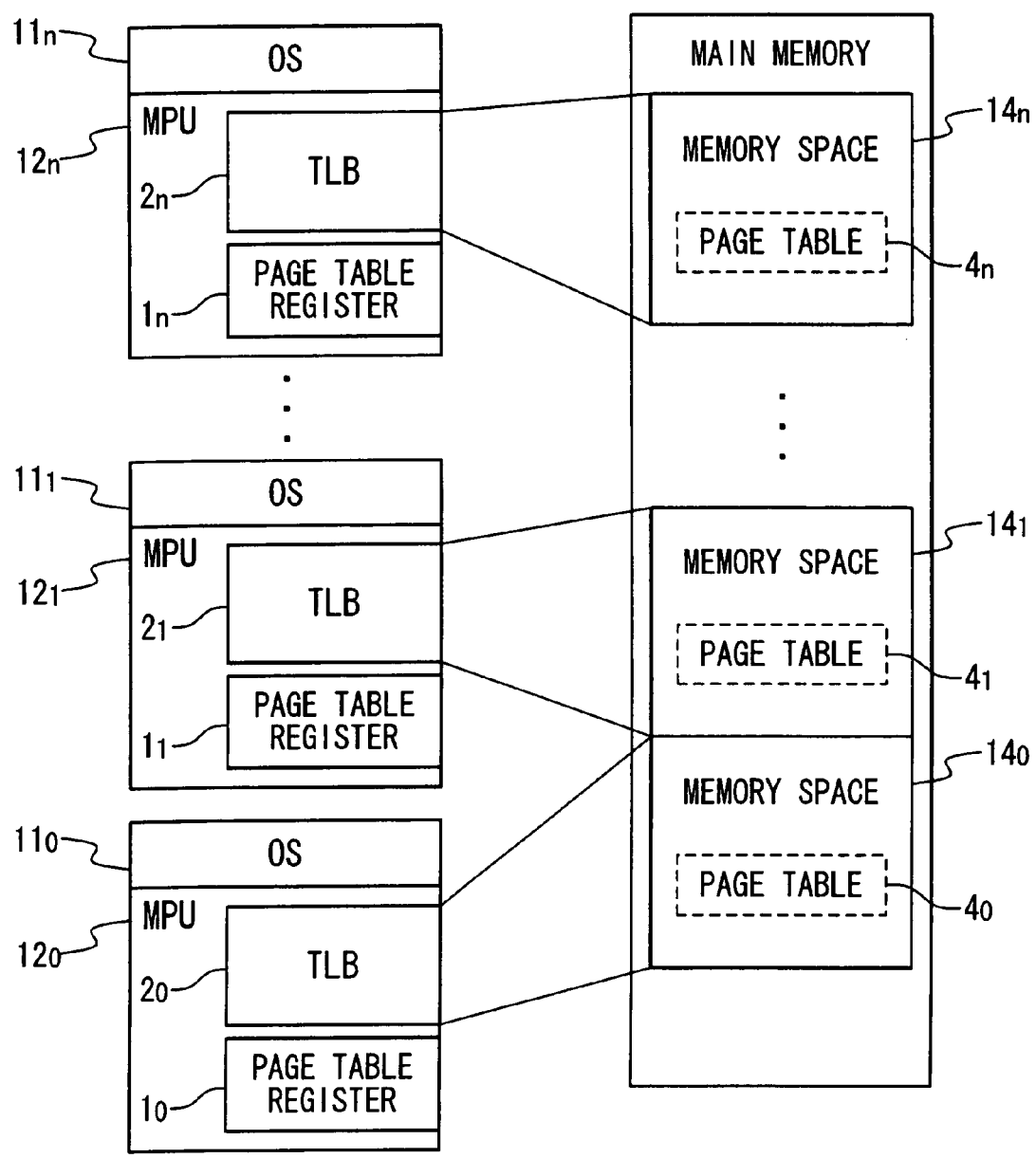
FIG. 5 is a diagram showing assignment of the whole memory space of a main memory to MPUs in the multi-processor system of the present invention.

FIG. 5 shows a diagram of assignment of the whole memory space of the main memory 14 to the MPUs $12_0$ to $12_n$ in the multi-processor system 10 of the present invention. It should be noted that the system configuration management table is not shown. The memory space (MEM) $14_j$ has a page table $4_j$ used to convert a virtual address into a physical address. The MPU $12_j$ has a page table register $1_j$ for referring to the page table $4_j$. The MPU $12_j$ further has a translation look-aside buffer (TLB) $2_j$ for serving as a cache for data of the memory space $14_j$ including the page table $4_j$ as an address translation table. The contents of the TLB $2_j$ is updated in accordance with the progress of the execution of the application program by the MPU $12_j$. If the MPU $12_j$ cannot acquire necessary data by use of the page table register $1_j$ when accessing to the TLB $2_j$, the MPU $12_j$ directly refers to the page table $4_j$ to acquire the necessary data.

When the plurality of operating systems run, the memory space is allocated by using the page table provided in the main memory space for every MPU. Usually, a virtual address is used to efficiently share the memory space between a plurality of programs and to cope with the limit of the capacity of the main memory 14. In this embodiment, the page tables are used for the plurality of operating systems. Virtual addresses and physical addresses are assigned to the memory space $14_j$ of the main memory 14. The virtual address assigned to the memory space (MEM) $14_j$ includes a virtual page number and an in-page offset. The physical address assigned to the memory space (MEM) $14_j$ includes a physical page number and the in-page offset.

FIG. 6 shows the page table $4_j$ in the multi-processor system 10 of the present invention. The page table $4_j$ stores a relation of the virtual page number of each virtual address and the physical page number of the physical address corresponding to the virtual address.

Figure 7:
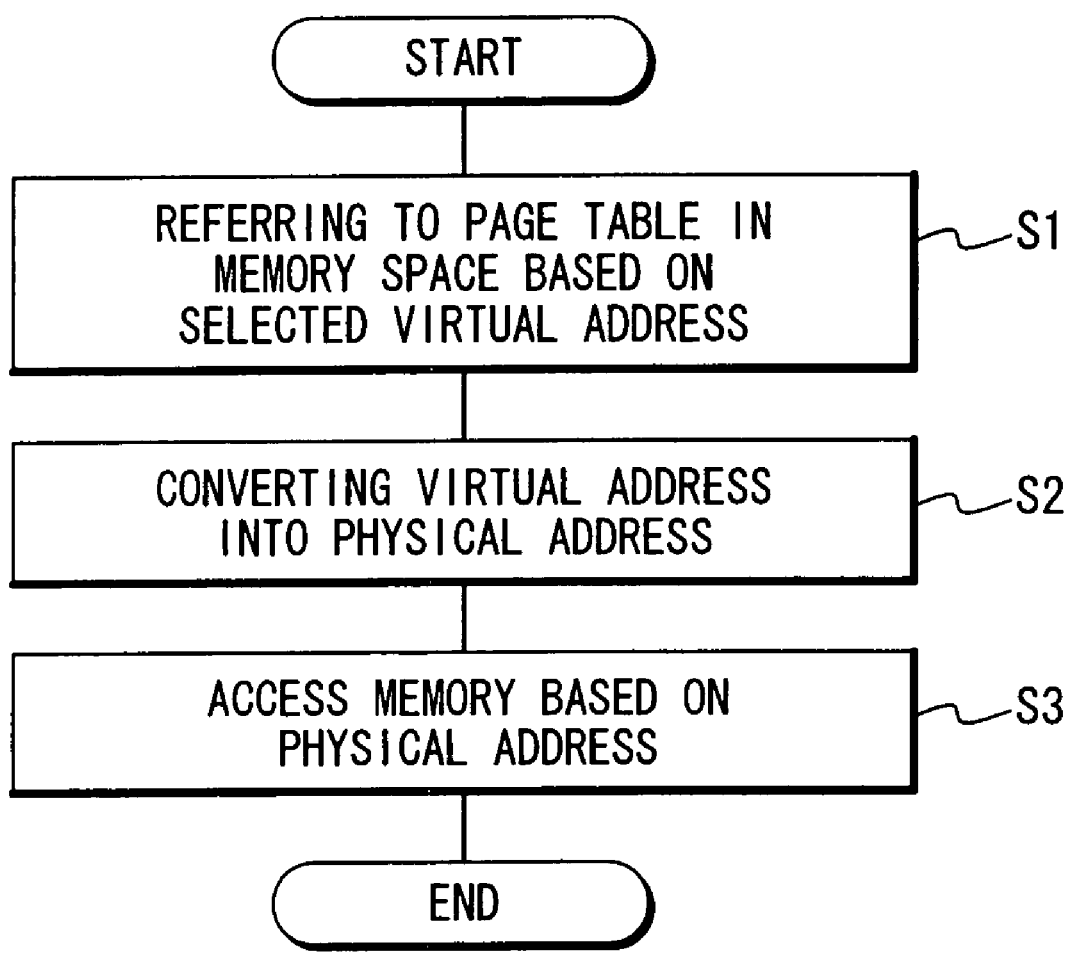
FIG. 7 is a flowchart showing the operation of the multi-processor system according to the first embodiment of the present invention.

FIG. 7 is a flowchart showing the operation of the multi-processor system 10 of the present invention. Each of the MPUs $12_0$ to $12_n$ is started by firmware by referring to the system configuration management table. At this time, the memory spaces $14_0$ to $14_n$ are allocated to the MPUs $12_0$ to $12_n$, respectively.

While executing a program, the MPU $12_j$ executes a command containing a virtual address. At this time, by use of the page table register $1_j$, the MPU $12_j$ refers to the page table $4_j$ of the allocated memory space (MEM) $14_j$ in response to the virtual address (Step S1). The MPU $12_j$ refers to the TLB to convert the virtual address into a physical address of the memory space (MEM) $14_j$ of the main memory 14 (Step S2). Then, the MPU $12_j$ accesses the memory (MEM) $14_j$ based on the physical address (Step S3).

According to the multi-processor system 10 of the present invention, the plurality of memory spaces (MEMs) $14_0$ to $14_n$ are assigned to the plurality of MPUs $12_0$ to $12_n$, respectively, and each of the plurality of PCI devices $16_0$ to $16_n$ is assigned to either of the MPUs $12_0$ to $12_n$. For this reason, according to the multi-processor system 10 of the present invention, even if a trouble such as abnormality or fault has occurred in the MPU $12_0$ among the MPUs $12_0$ to $12_n$, the MPUs $12_1$ to $12_n$ do not receive the influence of the trouble, and the resource/software of the operating systems $11_0$ to $11_n$, the memory spaces (MEMs) $14_0$ to $14_n$, and the PCI devices $16_0$ to $16_n$ do not receive the influence of the trouble at all.

Also, according to the multi-processor system 10 of the present invention, even when the trouble has occurred in the memory space (MEM) $14_0$ or the PCI device $16_0$, or a trouble has occurred in the operating system (OS) $11_0$ as well as the trouble in the MPU $12_0$, the MPUs $12_1$ to $12_n$ do not receive the influence of the trouble, and the resource/software assigned to the MPUs $12_1$ to $12_n$ do not receive the influence of the trouble at all.

In addition, according to the multi-processor system 10 of the present invention, a user can duplicate an important process, triplicate or more. For example, the same virtual address space may be assigned to the different physical memory spaces (MEMs) $14_0$ and $14_1$, and the MPUs $12_0$ and $12_1$ may operate on the same operating systems based on same application programs, respectively. In this case, even if the trouble has occurred in the MPU $12_0$, the MPU $12_1$ operates without receiving the influence of the trouble in the MPU $12_0$.

In this way, according to the multi-processor system 10 of the present invention, even if the trouble such as abnormality or defect has occurred, the influence of the trouble can be restricted to the minimum.

Next, the multi-processor system 10 according to the second embodiment of the present invention will be described below. The multi-processor system 10 according to the second embodiment of the present invention can further restrict the influence of the trouble. The same description of the multi-processor system 10 according to the second embodiment of the present invention as that of the first embodiment is omitted.

Figure 8:
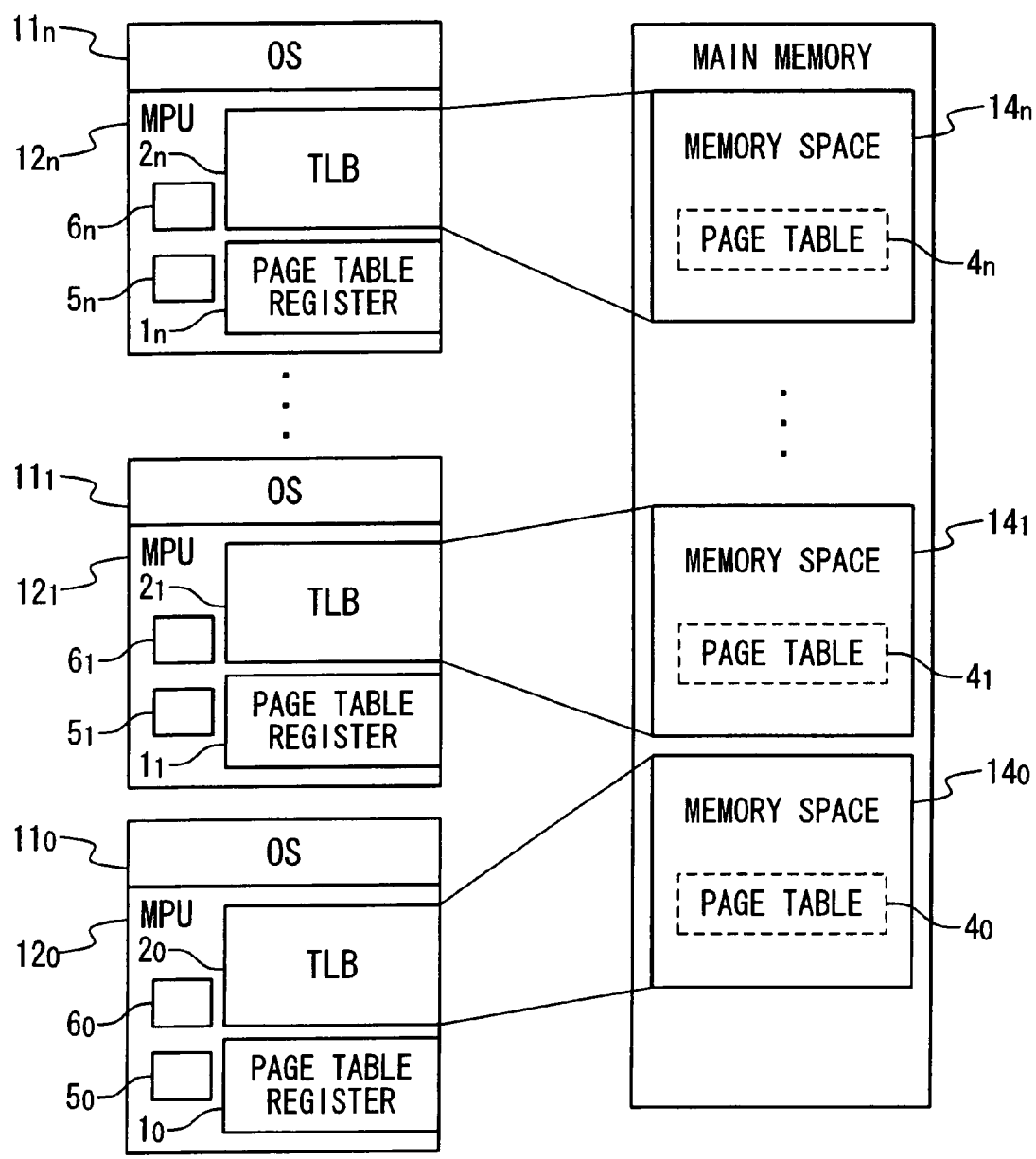
FIG. 8 is a schematic diagram showing the MPUs and a main memory in the multi-processor system according to a second embodiment of the present invention.

FIG. 8 shows a schematic diagram showing the MPUs $12_0$ to $12_n$ and the main memory 14 in the multi-processor system 10 according to the second embodiment of the present invention. The MPU $12_j$ has an upper limit & lower limit physical address storing unit $5_j$ and an address check circuit $6_j$ in addition to the page table register $1_j$ and the TLB $2_j$.

FIG. 9 shows the upper limit & lower limit physical address storing unit $5_j$ in the multi-processor system 10 of the second embodiment. The upper limit & lower limit physical address storing unit $5_j$ of the MPU $12_j$ stores an upper limit physical address of the memory space $14_j$ assigned to the MPU $12_j$ and a lower limit physical address of the memory space (MEM) $14_j$. The address check circuit $6_j$ of the MPU $12_j$ refers to the upper limit & lower limit physical address storing unit $5_j$ to determine whether the physical address corresponding to the virtual address is in a range from the upper limit physical address to the lower limit physical address in the memory space (MEM) $14_j$, and generates a determination result. Therefore, the above-mentioned range is a condition.

FIG. 10 shows the page table $4_j$ in the multi-processor system 10 according to the second embodiment of the present invention. The page table $4_j$ stores a relation of the virtual page number in the virtual address space and a physical page number in the physical address space corresponding to the memory space $14_j$ and an operating system (OS) number $8_j$ as an entry. The MPU $12_j$ recognizes and holds the operating system (OS) number $8_j$ for the memory space $14_j$ stored in the page table $4_j$.

The operating system (OS) number $8_j$ is an identifier for uniquely identifying the operating system allocated to the memory space $14_j$. In order to add this entry to each of the page tables $4_0$ to $4_n$, N bits (the number of operating systems satisfies a relation of ($N \leq 2^N$). Under assumption that different operating systems are assigned to the respective MPUs, N is desired to satisfy (the number of MPUs)$\leq 2^N$.

FIG. 11 is a flowchart showing the operation of the multi-processor system 10 according to the second embodiment of the present invention.

By use of the page table register $1_j$, the MPU $12_j$ refers to the TLB $2_j$ or the page table $4_j$ of the memory space $14_j$ in response to the virtual address (Step S1). Subsequently, the MPU $12_j$ checks whether or not the operating system (OS) number $8_j$ set and held based on the system configuration management table is coincident with the operating system (OS) number $8_j$ stored in the page table $4_j$ of the memory space $14_j$ (Step S11). As the check result, when the operating system (OS) number $8_j$ held by the MPU $12_j$ and the operating system (OS) number $8_j$ stored in the page table $4_j$ of the memory space (MEM) $14_j$ are not coincident with each other, that is, when the virtual address is not the appropriate memory space $14_j$ (Step S11—NO), the MPU $12_j$ does not access the memory space $14_j$. On the other hand, as the checked result, the operating system (OS) number $8_j$ held by the MPU $12_j$ and the operating system (OS) number $8_j$ stored in the page table $4_j$ of the memory space (MEM) $14_j$ are coincident with each other, that is, it is the appropriate memory space $14_j$ (Step S11—YES), by use of the page table register $1_j$, the MPU $12_j$ refers to the TLB $2_j$ or the page table $4_j$ to convert the virtual address into the physical address. That is, the MPU $12_j$ converts the virtual address into the physical address (Step S2). Then, the address check circuit $6_j$ of the MPU $12_j$ refers to the upper limit & lower limit physical address storing unit $5_j$ based on the physical address and generates the determination result indicating whether or not the physical address obtained at the step S2 satisfies the above-mentioned condition (Step S12). This determination result indicates whether or not the physical address is included in the range between the upper limit physical address and the lower limit physical address. For example, when the determination result indicates that the physical address is not included in the above-mentioned range, that is, when the physical address obtained at the step S2 does not satisfy the above-mentioned condition, the physical address is not adequate (Step S13—NO). In this case, the MPU $12_j$ does not access the memory space $14_j$. Also, when the determination result indicates that the physical address is included in the above-mentioned range, that is, when the physical address obtained at the step S2 satisfies the above-mentioned condition, the physical address is suitable (Step S13—YES). In this case, the MPU $12_j$ accesses the memory space $14_j$ (Step S3).

According to the multi-processor system 10 in the second embodiment, the MPU $12_j$ can avoid the illegal access to another memory space different from the memory space $14_j$ to be accessed. The page table $4_j$ may have an identifier of the MPU $12_j$ or memory space $14_j$ in place of the operating system number. In either case, the relation between them can be confirmed. Therefore, even if a trouble such as abnormality or defect has occurred in the MPU $12_0$ of the MPUs $12_0$ to $12_n$, the MPUs $12_1$ to $12_n$ do not receive the influence of the trouble. Also, the resource/software such as the operating systems $11_1$ to $11_n$, the memory spaces $14_1$ to $14_n$, and the PCI devices $16_1$ to $16_n$ assigned to the MPUs $12_1$ to $12_n$ do not receive the influence of the trouble at all.

In this way, with the multi-processor system 10 in the second embodiment, the influence of the trouble can be restricted to the further minimum.

What is claimed is:

1. A multiprocessor system comprising:
    a plurality of microprocessors configured to operate a plurality of operating systems, respectively;
    a memory section configured to have a plurality of memory spaces respectively allocated to the plurality of microprocessors;
    a user defined configuration management table, whereby the plurality of memory spaces are respectively allocated to the plurality of microprocessors by a user; and
    wherein each of the plurality of microprocessors further comprise:
        a translation look-aside buffer (TLB) configured to store a copy of at least a part of data stored in the allocated memory spaces corresponding to the TLB, the copy including a relation of virtual addresses of a virtual address space to corresponding physical address in the memory space; and
        a page table register configured to refer to the TLB in response to an execution virtual address, generated based on an application program executed by the microprocessor, to determine an execution physical address corresponding to the execution virtual address, and when the TLB contains an execution physical address corresponding to the execution virtual address, the microprocessor accesses the memory space based on the execution physical address corresponding to the execution virtual address; and
        when said TLB does not contain an execution physical address corresponding to the execution virtual address, the microprocessor refers directly to a page table in the associated memory space, the page table being configured to store the relation of execution virtual addresses to the execution physical addresses; and the microprocessor accesses the memory space based on the execution physical address related to the execution virtual address in the page table.

2. The multiprocessor system according to claim 1, wherein the page table is provided for each allocated memory space to store the relation of virtual addresses and corresponding physical addresses, and
    the TLB of a microprocessor stores a copy of the page table.

3. The multiprocessor system according to claim 1, wherein the page table stores an identifier to identify a respective operating system allocated to a memory space, and
    a microprocessor refers to the TLB containing a copy of the page table to determine whether the stored identifier and an identifier held by the microprocessor are coincident, and refers to the TLB for translation of an execution virtual address into an execution physical address, when the stored identifier and the identifier held by the microprocessor are coincident.

4. The multiprocessor system according to claim 1, wherein each of the plurality of microprocessors further comprises:
    an address check circuit configured to generates a determination result to indicate whether an execution physical address meets a predetermined condition, and
    when the determination result indicates that the execution physical address meets the predetermined condition, the associated microprocessor accesses memory space based on the execution physical address.

5. The multiprocessor system according to claim 4, wherein said predetermined condition is whether said execution physical address is in a range from an upper limit physical address to a lower limit physical address in said memory space.

6. The multiprocessor system according to claim 1, wherein at least one microprocessor further comprises:
    an upper limit & lower limit physical address storage section configured to store an upper limit physical address and a lower limit physical address.

7. The system of claim 1, wherein input/output devices are allocated to a respective input/output device group by way of the user defined configuration management table.

8. The system of claim 1, wherein respective input/output device groups are allocated to respective microprocessors by way of the user defined configuration management table.

9. The system of claim 1, wherein the user defined configuration management table is referred to at the start of the system.

10. The system of claim 1, wherein the same virtual address is allocated to different physical addresses by way of the user defined configuration management table.

11. The system of claim 1, wherein, by way of the user defined configuration management table, a first microprocessor is allocated to operate a process which is a duplicate of a process that a second microprocessor is allocated to operate.

12. A memory access method comprising:
    providing a plurality of microprocessors configured to operate a plurality of operating systems, respectively, a memory section configured to have a plurality of memory spaces allocated to said plurality of microprocessors, and a user defined configuration management table, whereby the plurality of memory spaces are allocated to respective microprocessors by a user; and
    accessing an allocated memory space of said plurality of memory spaces by one of said plurality of microprocessors by examining a page table register of the microprocessor configured to refer to a translation look-aside buffer (TLB) of the microprocessor in response to an execution virtual address, generated based on an application program executed by the microprocessor, to determine an execution physical address corresponding to the execution virtual address, the TLB being configured to store a copy of at least a part of data stored in the allocated memory spaces corresponding to the TLB, the copy including a relation of virtual addresses of a virtual address space to corresponding physical address in the memory space;
    when the TLB contains an execution physical address corresponding to the execution virtual address, accessing the memory space based on the execution physical address corresponding to the execution virtual address;
    when said TLB does not contain an execution physical address corresponding to the execution virtual address referring directly to a page table in the associated memory space, storing in the page table the relation of execution virtual addresses to the execution physical addresses;
    and accessing the memory space based on the execution physical address related to the execution virtual address in the page table.

13. The memory access method according to claim 12, wherein the page table in said memory space stores an identifier to identify an operating system, and
    said accessing comprises:

referring to said page table in the said memory space to determine whether the stored identifier and an identifier held by the accessing microprocessor are coincident with each other; and when the stored identifier and said identifier held by the accessing microprocessor are coincident with each other, determining the execution physical address.

14. The memory access method according to claim 12, wherein at least one microprocessor further comprises an address check circuit, and said accessing comprises:

when an execution physical address is determined, generating a determination result from an address checking circuit to indicate whether or not the execution physical address meets a predetermined condition; and when the determination result indicates that the execution physical address meets the predetermined condition, accessing said memory space based on said execution physical address.

15. The memory access method according to claim 12, wherein a condition is a range from an upper limit to a lower limit of physical addresses allocated to the memory space of a microprocessor and said accessing comprises:

when an execution physical address is determined, generating a determination result indicating whether or not the execution physical address is within the range; and when the determination result indicates that the execution physical address is within the range, accessing the memory space based on the execution physical address.

* * * * *